US012613839B2

(12) United States Patent
Ueki

(10) Patent No.: US 12,613,839 B2
(45) Date of Patent: Apr. 28, 2026

(54) INFORMATION MANAGEMENT SYSTEM AND OPTION MANAGEMENT APPARATUS

(71) Applicants: KABUSHIKI KAISHA TOSHIBA, Tokyo (JP); TOSHIBA DIGITAL SOLUTIONS CORPORATION, Kawasaki (JP)

(72) Inventor: Hirotaka Ueki, Yokohama Kanagawa (JP)

(73) Assignees: Kabushiki Kaisha Toshiba, Kawasaki (JP); Toshiba Digital Solutions Corporation, Kawasaki (JP)

( * ) Notice: Subject to any disclaimer, the term of this patent is extended or adjusted under 35 U.S.C. 154(b) by 0 days.

(21) Appl. No.: 18/856,799

(22) PCT Filed: Apr. 7, 2023

(86) PCT No.: PCT/JP2023/014451
§ 371 (c)(1),
(2) Date: Oct. 14, 2024

(87) PCT Pub. No.: WO2023/199871
PCT Pub. Date: Oct. 19, 2023

(65) Prior Publication Data
US 2025/0252085 A1 Aug. 7, 2025

(30) Foreign Application Priority Data

Apr. 15, 2022 (JP) ................................. 2022-067807

(51) Int. Cl.
*G06F 16/21* (2019.01)
*G05B 19/418* (2006.01)
(Continued)

(52) U.S. Cl.
CPC ......... *G06F 16/21* (2019.01); *G05B 19/4183* (2013.01); *G06F 16/2428* (2019.01); *G06F 16/26* (2019.01); *G06Q 50/04* (2013.01)

(58) Field of Classification Search
None
See application file for complete search history.

(56) References Cited

U.S. PATENT DOCUMENTS 5,884,322 A * 3/1999 Sidhu .................. H04L 61/5038
709/200
6,519,588 B1 * 2/2003 Leschner .............. G06F 16/284
(Continued)

FOREIGN PATENT DOCUMENTS

JP       2005-56325 A      3/2005
JP       2011-191803 A     9/2011
JP       2020-87188 A      6/2020

*Primary Examiner* — Debbie M Le
(74) *Attorney, Agent, or Firm* — Finnegan, Henderson, Farabow, Garrett & Dunner, LLP

(57) ABSTRACT

[PROBLEM] To eliminate the need of master information maintenance and perform control for narrowing down options by associating option-type menu items with each other.
[SOLVING MEANS] An information management system according to an embodiment assigns option IDs to combinations of item name and item values of fields constituting a record, the option IDs being different for each of the fields, and producing option master data pieces. The information management system produces, for each one of the fields, related option master data pieces by setting the option ID of each of the other fields as a related option ID. The number of the produced related option master data pieces corresponds to the number of the other fields. The information management system outputs the item values as options of the search items, and when an option is specified in a first search item, extracts at least one of the related option master
(Continued)

data pieces that includes the option ID of the specified option as the related option ID, and outputs, as an option of a second search item, the item value of the option ID linked to the extracted at least one related option master data piece.

6 Claims, 10 Drawing Sheets

(51) Int. Cl.
| | |
|---|---|
| *G06F 16/242* | (2019.01) |
| *G06F 16/26* | (2019.01) |
| *G06Q 50/04* | (2012.01) |

(56)  References Cited

U.S. PATENT DOCUMENTS

| | | | | |
|---|---|---|---|---|
| 8,515,569 | B2 * | 8/2013 | Hanawa | G06Q 10/105 |
| | | | | 700/109 |
| 10,621,215 | B1 * | 4/2020 | Danaei | G06F 16/2455 |
| 11,392,110 | B2 * | 7/2022 | Chiba | G05B 19/406 |
| 11,544,331 | B2 * | 1/2023 | Balakrishnan | G06F 16/955 |
| 2013/0097547 | A1 * | 4/2013 | Ohwa | A63B 24/0062 |
| | | | | 715/772 |
| 2014/0200879 | A1 * | 7/2014 | Sakhai | G06Q 50/12 |
| | | | | 704/9 |
| 2020/0175613 | A1 | 6/2020 | Ueno et al. | |

* cited by examiner

【FIG. 1】
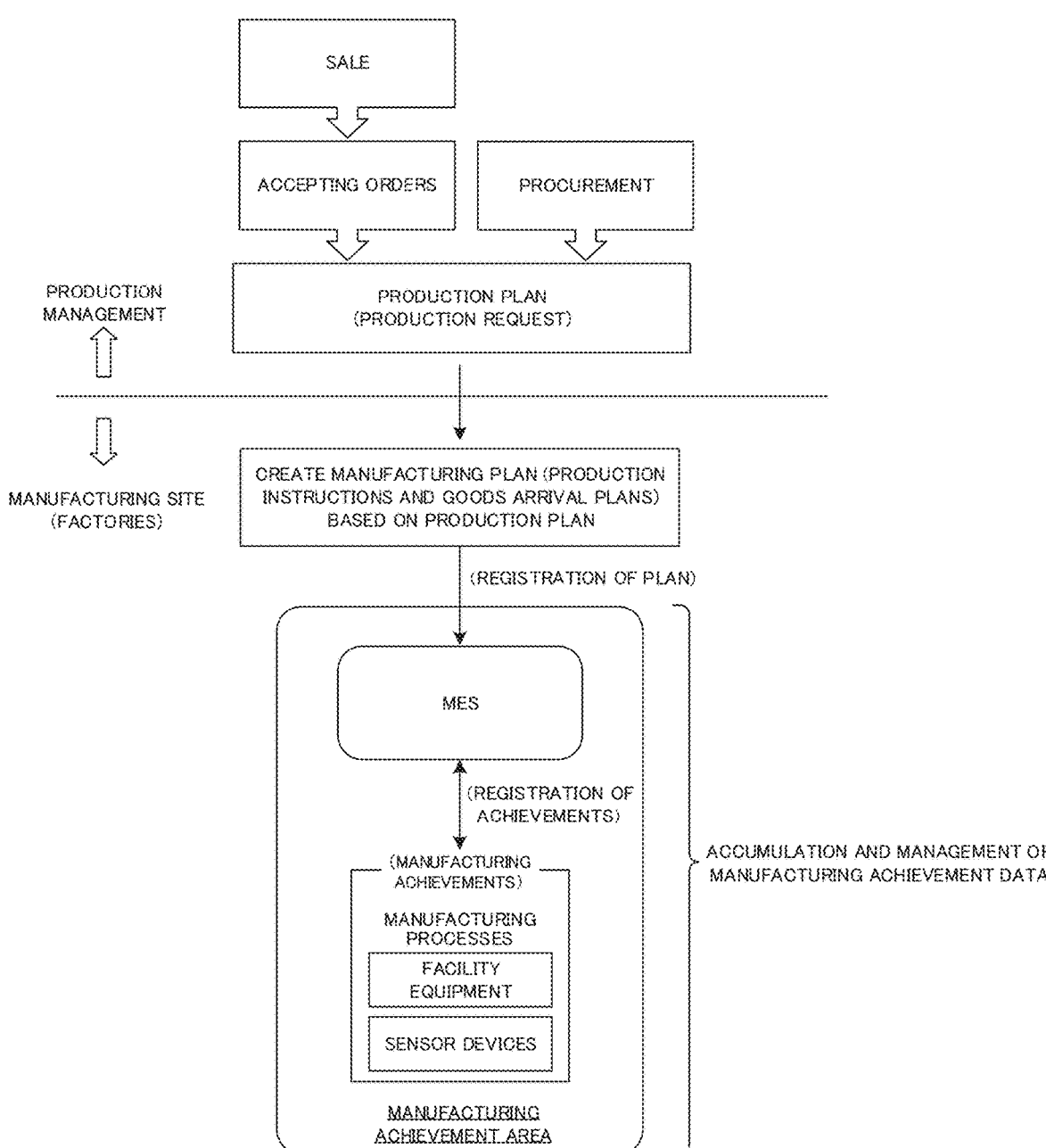

【FIG. 2】
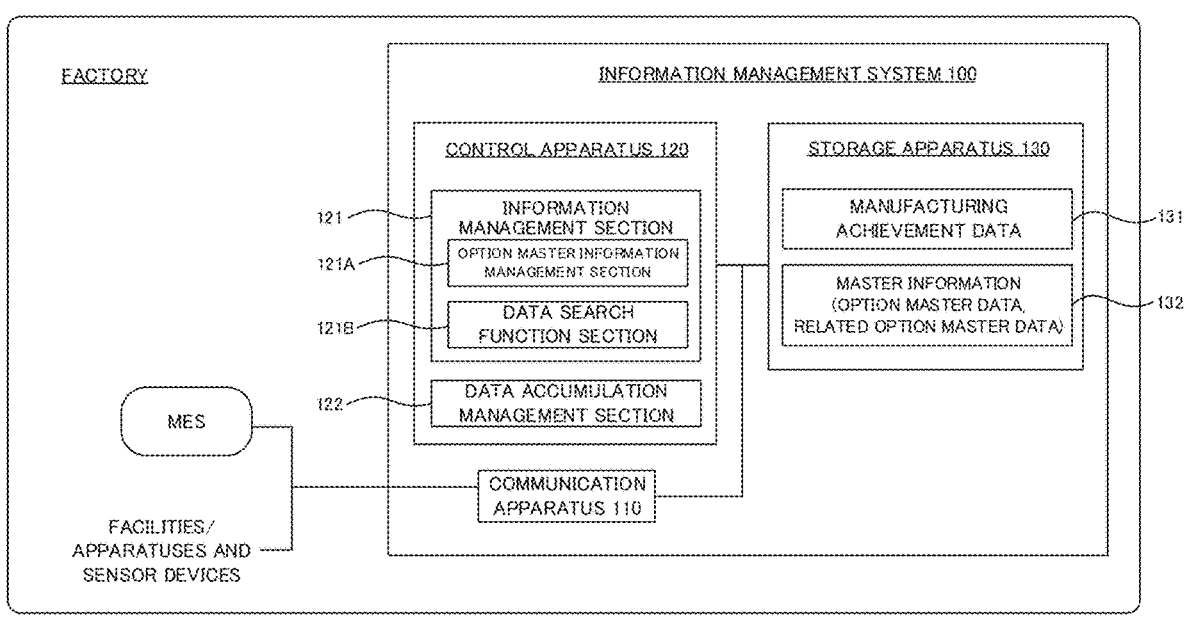

[FIG. 3]

| |
|---|
| FIRST FIELD<br>(ITEM NAME : FACTORY (MANUFACTURING PLACE OF PRODUCTS)) |
| SECOND FIELD<br>(ITEM NAME : LINE (LINE WHERE PROCESS OPERATION IS PERFORMED)) |
| THIRD FIELD<br>(PROCESS OPERATIOIN (DETAILS OF PROCESS OPERATION)) |
| FOURTH FIELD<br>(ITEM NAME : FACILITY) |
| FIFTH FIELD<br>(ITEM NAME : PRODUCT NUMBER) |
| SIXTH FIELD<br>(ITEM NAME : START DATE AND TIME) |
| SEVENTH FIELD<br>(ITEM NAME : END DATE AND TIME) |
| · · · · · |

MANUFACTURING
ACHIEVEMENT
RECORD ⇨

```
        EXAMPLE OF MANUFACTURING
            ACHIEVEMENT RECORD (ITEM NAME)          : (ITEM VALUE)
FACTORY              : F01
LINE                 : L01
PROCESS OPERATION    : PRC01
FACILITY             : E01
PRODUCT NUMBER       : PN-01
START DATE AND TIME  : 10/13 16:50
END DATE AND TIME    : 10/13 17:30
LOT                  : LOT-01
SERIAL               : SN-01
. . . .
```

【FIG. 4】

(MANUFACTURING ACHIEVEMENT DATA)

| [SUBJECT] (Who) Who | [OBJECT] (whome) whome | [EVENT] (what) what | [TIME] (when) when | [PLACE] (Where) Where | [CAUSE] (Why) Why | [SITUATION] (How) How |
|---|---|---|---|---|---|---|
| FACILITY 1 (FACILITY SERIAL ID : 11111) | COMPONENT PART NUMBER (D-001) SERIAL ID(31235) / COMPONENT PART NUMBER (E-001) SERIAL ID(41234) / COMPONENT PART NUMBER (F-001) SERIAL ID(41235) | SUBSTRATE ASSEMBLY | 2016/9/2 10:30 | THIRD STATION OF SUBSTRATE ASSEMBLY FIRST LINE OF SUBSTRATE ASSEMBLY PROCESS | -- | -- |
| INSPECTION FACILITY 1 (FACILITY SERIAL ID : 22222) | COMPONENT PART NUMBER (D-001) SERIAL ID(31235) | SUBSTRATE ASSEMBLY INSPECTION | 2016/9/2 11:00 | INSPECTION STATION OF SUBSTRATE ASSEMBLY FIRST LINE OF SUBSTRATE ASSEMBLY PROCESS | -- | -- |
| ..... | ..... | ..... | ..... | ..... | ..... | ..... |
| FACILITY 2 (FACILITY SERIAL ID : 99999) | MANUFACTURING NUMBER(A-001) SERIAL ID(12345) / COMPONENT PART NUMBER (B-001) SERIAL ID(21234) / COMPONENT PART NUMBER (I-001) SERIAL ID(21235) | ENTIRE PC ASSEMBLY | 2016/9/2 12:30 | FIRST STATION OF ENTIRE PC ASSEMBLY FIRST LINE OF ENTIRE PC ASSEMBLY PROCESS | -- | -- |
| ..... | ..... | ..... | ..... | ..... | ..... | ..... |

(TIME-SERIES)

[FIG. 5]

(EXAMPLE OF SEARCH ITEMS ON SEARCH SCREEN)

PERIOD [＿＿＿＿＿▦] ～ [＿＿＿＿＿▦]

LINE [＿＿＿＿▼]    PROCESS OPERATION [＿＿＿＿▼]    FACILITY [＿＿＿＿▼]    PRODUCT NUMBER [＿＿＿＿▼]

【FIG. 6】
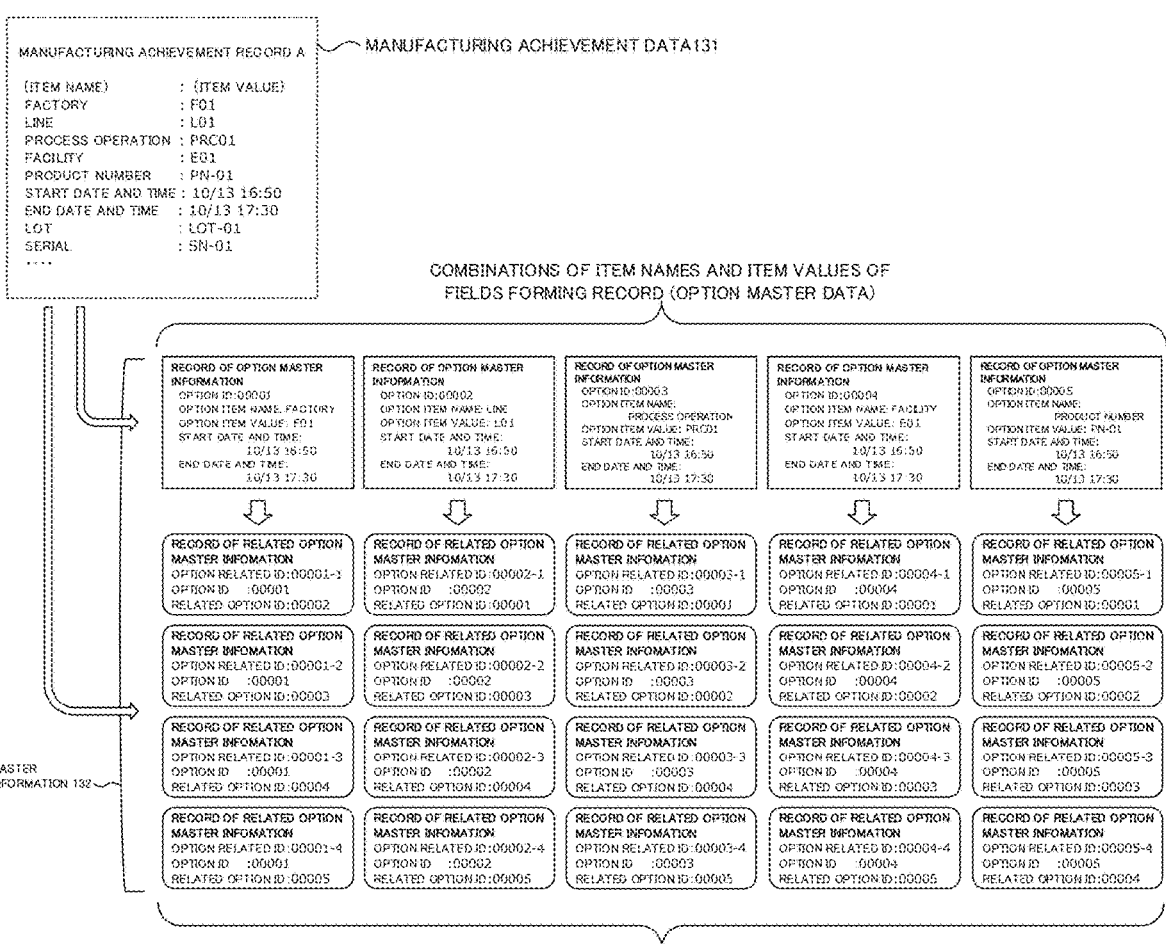

【FIG. 7】
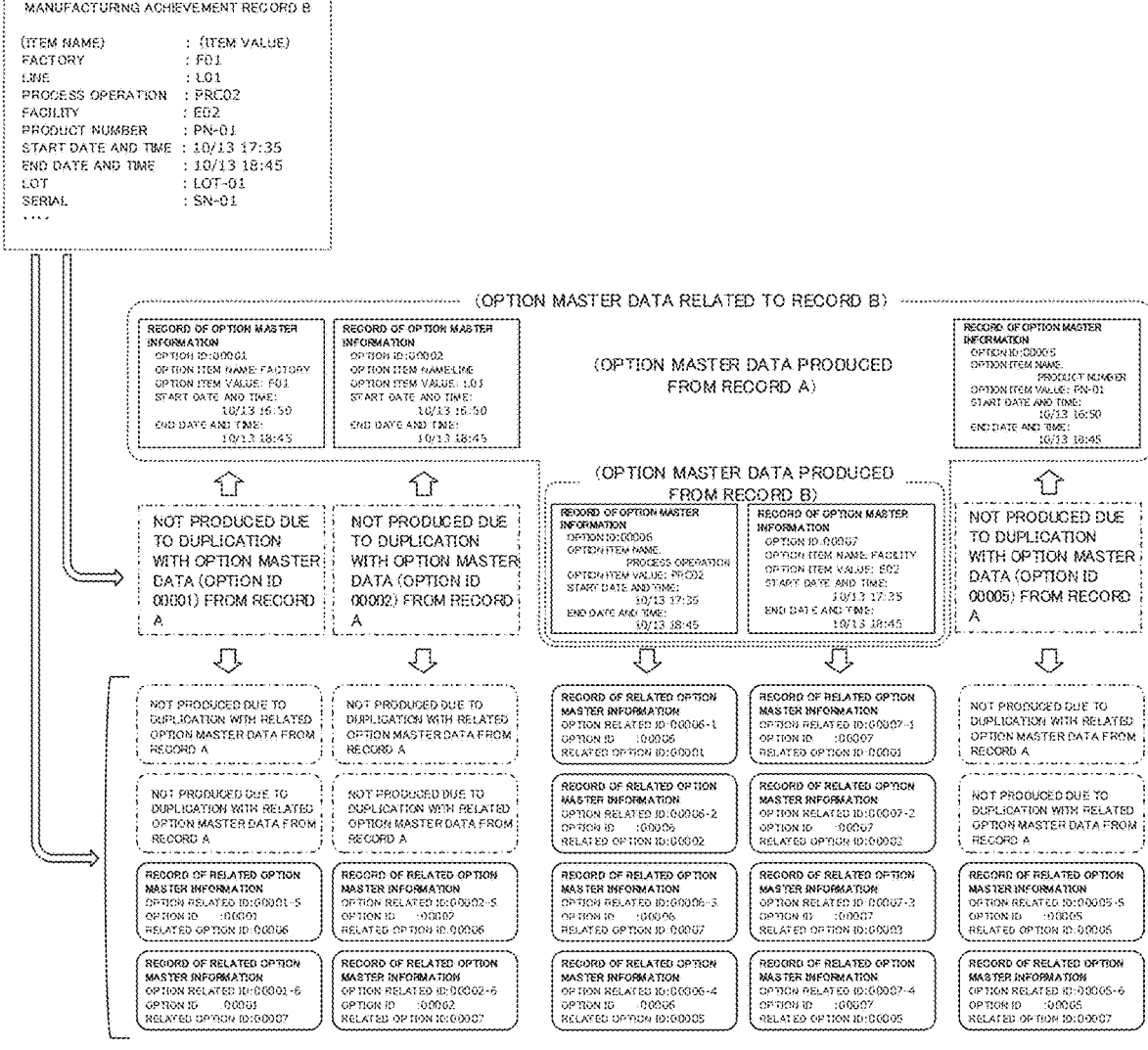

[FIG. 8]
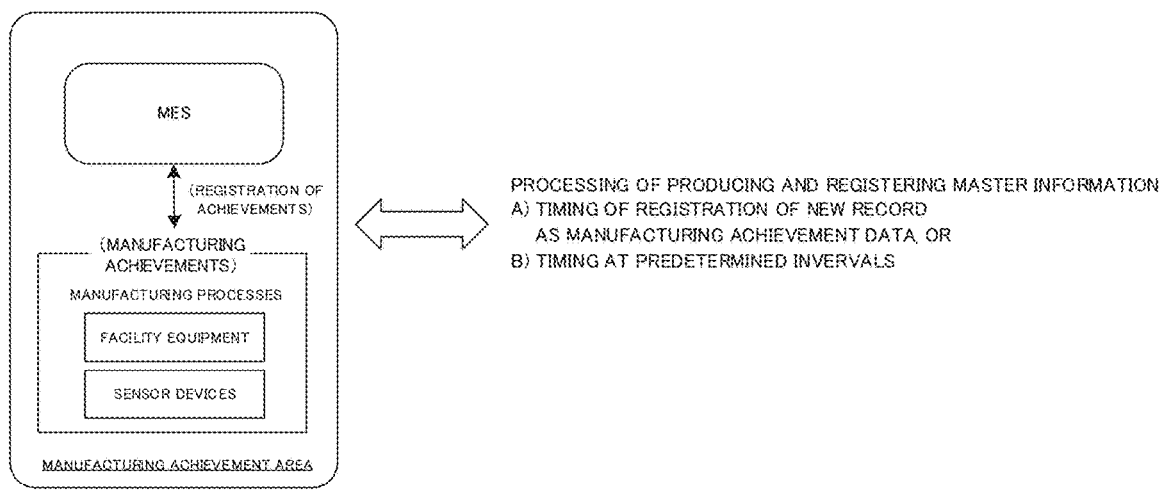
PROCESSING OF PRODUCING AND REGISTERING MASTER INFORMATION
A) TIMING OF REGISTRATION OF NEW RECORD
    AS MANUFACTURING ACHIEVEMENT DATA, OR
B) TIMING AT PREDETERMINED INVERVALS 【FIG. 9】
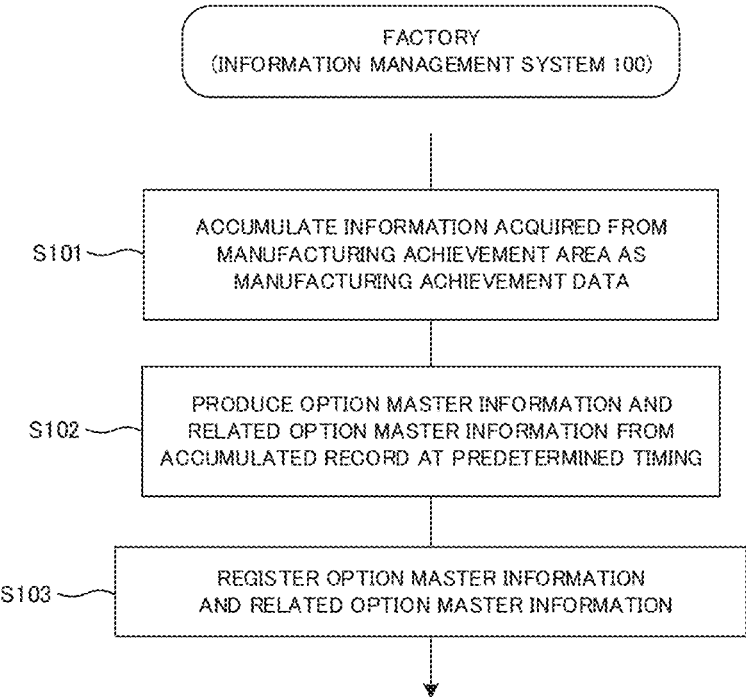

【FIG. 10】
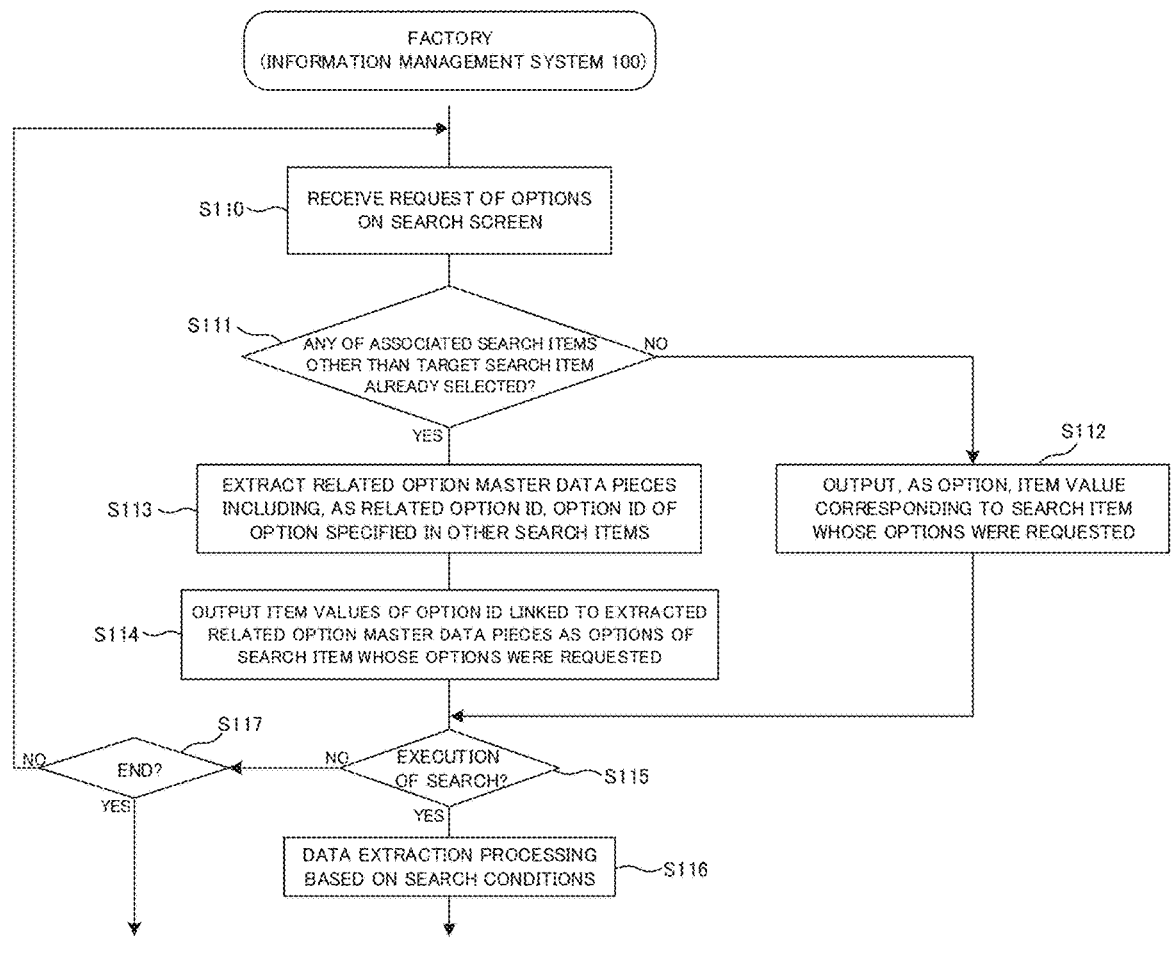

INFORMATION MANAGEMENT SYSTEM AND OPTION MANAGEMENT APPARATUS

CROSS-REFERENCE TO RELATION APPLICATIONS

This Application is the U.S. National Stage of International Application No. PCT/JP2023/014451, filed Apr. 7, 2023, which is based upon and claims the benefit of priority to Japanese Application No. 2022-067807, filed Apr. 15, 2022, the entire contents of both of which are incorporated herein by reference.

TECHNICAL FIELD

Embodiments of the present invention relate to a technique for an automatic option generation and option control in information search.

BACKGROUND ART

Search screens for searching accumulated information include input-type menu items which allow direct input of search keywords related to search items and option-type menu items which show some options and allow selection therefrom. The option-type menu item shows options with reference to previously provided option master information.

PRIOR ART DOCUMENT

Patent Document

[Patent Document 1] Japanese Patent Laid-Open No. 2020-87188

DISCLOSURE OF THE INVENTION

Problems to be Solved by the Invention

It is an object of the present invention to provide an information management system capable of automatically generating options based on groups of daily accumulated information and readily performing control for narrowing down of the options in which option-type menu items are associated with each other.

Means for Solving the Problems

An information management system according to an embodiment includes a first control section configured to perform first processing of assigning option IDs to combinations of item names and item values of fields constituting a record, the option IDs being different for each of the fields, and producing option master data pieces each including the option ID, the item name, and the item value, second processing of producing, for each one of the fields, related option master data pieces by setting the option ID of each of the other fields as a related option ID, the number of the produced related option master data pieces corresponding to the number of the other fields, and third processing of registering the option master data pieces and the related option master data pieces in a predetermined storage area; and a second control section configured to output, on a search screen showing the fields set as search items, the item values as options of the search items, and when an option is specified in a first search item, extract at least one of the related option master data pieces that includes the option ID of the specified option as the related option ID, and output, as an option of a second search item, the item value of the option ID linked to the extracted at least one related option master data piece.

BRIEF DESCRIPTION OF THE DRAWINGS

FIG. 1 An explanatory diagram for information handled by an information management system according to Embodiment 1.

FIG. 2 A block diagram showing functions of the information management system according to Embodiment 1.

FIG. 3 A diagram for explaining a record according to Embodiment 1.

FIG. 4 A diagram showing an example of manufacturing achievement data according to Embodiment 1.

FIG. 5 A diagram showing an example of a search screen and various search items according to Embodiment 1.

FIG. 6 A diagram showing an example of option master data and related option master data produced from the record according to Embodiment 1.

FIG. 7 A diagram showing an example of option master data and related option master data produced in view of the relationship with already produced master data according to Embodiment 1.

FIG. 8 A diagram showing an example of timing of production and registration of option master data and related option master data according to Embodiment 1.

FIG. 9 A diagram showing a flow of producing option master data and related option master data according to Embodiment 1.

FIG. 10 A diagram showing a flow chart of information processing including option providing processing in response to an option request on a search screen according to Embodiment 1.

MODE FOR CARRYING OUT THE INVENTION

An embodiment of the present invention is hereinafter described with reference to the accompanying drawings.

As described above, the option-type menu items used in information search requires previously provided option master information. The option master information has a problem in that its maintenance for update (addition, deletion, modification etc.) takes much time and effort. For example, when an item value of a field forming part of a record increases or reduces, the option master information should be updated in response to the increase or reduction. If the update maintenance of the option master information is delayed, it may not be possible to provide options from a new record or acquire search results.

In particular, a huge amount of manufacturing achievement data is accumulated daily in manufacturing sites and a variety of item values of fields are provided as options, so that the update maintenance of the option master information requires significant effort. This may lead to a situation in which the maintenance of the option master information is neglected and thus direct input is easier and faster. To perform direct input, however, an appropriate search keyword should be input to extract desired information.

A difficult part of the maintenance of the option master information is a function of association between option-type menu items. For example, on a search screen including multiple option-type menu items, an option is specified in a first option-type menu item, and then an option associated with the option specified in the first option-type menu item should be provided in a second option-type menu item. On such a search screen including multiple option-type menu items, association between search items is needed, and it is necessary to hold, as master information, relational information which indicates association of an option A in a search item 1 with an option B in a search item 2.

To address the conventional problem, an information management system according to Embodiment 1 allows improved maintenance of option master information and achieves an environment in which a favorable association function is provided between option-type menu items to prevent a situation where search results cannot be acquired.

Embodiment 1

FIG. 1 is an explanatory diagram for information handled by an information management system according to Embodiment 1. For example, a product lifecycle starts from planning and design of products in a business management layer, passes through production (manufacturing) of the products in a manufacturing site layer (factories), then to operation, use, and maintenance at the market (field and product use).

In the example of FIG. 1, the business management layer creates a production management plan (a production request to the manufacturing site) of products from a viewpoint of the number of products put on the market per month. For the created production management plan, planning and reference information is managed such as procurement management information for managing suppliers of materials and parts, and manufacturing parameters and manufacturing recipes based on product specifications.

The manufacturing site (factories) includes existing manufacturing management systems (for example, MESs) to individually manage manufacturing plans and achievements, creates production instructions and goods arrival plans based on the production management plan created by the business management layer, and manages them with the existing MESs. The MES holds the created manufacturing plan and receives input of manufacturing achievements provided from manufacturing processes (including facility equipment and sensor devices in the manufacturing processes) to manage plans and achievements of products.

The manufacturing site corresponding to a manufacturing achievement area daily accumulates and manages manufacturing achievement data of various types of products. The manufacturing achievement data is used in quality control of products and also in terms of traceability.

FIG. 2 is a block diagram showing the functions of the information management system 100. The information management system 100 principally accumulates and manages the manufacturing achievement data from the manufacturing achievement area, and as part of its management function, provides a search function (data search function section 121B) to search the manufacturing achievement data (manufacturing achievement record) through a search screen. The search screen includes multiple search items, and at least two of the search items are option-type menu items. An option master management section 121A generates and registers options for the option-type menu items.

The search items included on the search screen may include input-type menu items which allow direct input of search keywords as well as the option-type menu items. In other words, all of the multiple search items may be option-type menu items, or at least two option-type menu items and some input-type menu items may be included.

The information management system 100 includes a communication apparatus 110, a control apparatus 120, and a storage apparatus 130.

The communication apparatus 110 is connected to MESs at factories, facility equipment, various types of apparatuses, or sensor devices in manufacturing processes to perform data communication control.

The control apparatus 120 includes an information management section 121 and a data accumulation management section 122. The information management section 121 includes the option master management section 121A (corresponding to a first control section) and the data search function section 121B (corresponding to a second control section).

The storage apparatus 130 stores manufacturing achievement data 131 and master information 132. The master information 132 includes option master data and related option master data.

First, how to accumulate data in Embodiment 1 is described. FIG. 3 is a diagram showing an example of a record of the manufacturing achievement data stored in the storage apparatus 130. A single record consists of multiple fields, and each of the fields is assigned an item name (column attribute) and holds a corresponding item value. Thus, a combination of the item name and the item value is held in each field, and multiple different fields constitute one record. The fields are arranged in any order.

For example, a record of the manufacturing achievement data includes, at least, a first field (item name: factory (a manufacturing place of products)), a second field (item name: line (a line where a process operation is performed), a third field (item name: process operation (representing details of a process operation), a fourth field (item name: facility (a facility used in a process operation), a fifth field (item name: product number (a product number assigned to products of the same type), a sixth field (item number: start date and time (a start date and time of a process), and a seventh field (item name: end date and time (an end date and time associated with a start date and time). It should be noted that the record may include other fields such as a lot number and a serial number, and one record may consist of any fields.

The item names correspond to search items, and the item values correspond to options. As shown in FIG. 3, the item value includes alphabet characters, numbers, and symbols such as hyphens and underscores in combination, and consists of a string of characters. It should be noted that the item value may include a string of characters such as Chinese characters, hiragana (Japanese characters), and katakana (Japanese characters), or may include only alphabet characters or numbers. Any character string may be used for the item values.

According to the prepared record form (data model) described above, the data accumulation management section 122 can produce a manufacturing achievement record from various types of information collected in the manufacturing achievement area and store the produced record as manufacturing achievement data.

Another example of the data model is a record shown in FIG. 4. The example of FIG. 4 is a manufacturing achievement record produced by structuring various types of information collected in the manufacturing achievement area according to a data structure definition consisting of "subject (Who)," "object (Whom)," "event (What)," "time (When)," "place (Where)," and "situation (How)" (5W1H). In this record configuration, a combination of an item name and an item value of each field can be seen similarly to the example of FIG. 3.

Figure 5:
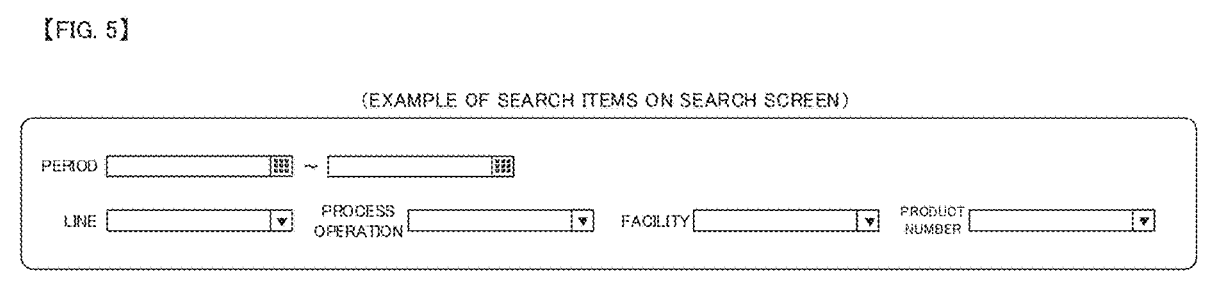

FIG. 5 is a diagram showing an example of the search screen and various search items. The search item "line" corresponds to the second field, the search item "process operation" corresponds to the third field, the search item "facility" corresponds to the fourth field, the search item "product number" corresponds to the fifth field. The search item "period" corresponds to the sixth field and seventh field. In the example of FIG. 5, the search item "period" can be input by setting a date through a calendar function or directly entering a date and time. The search items other than the search item "period" are option-type menu items which allow selection from options extracted from option master data accumulated in the master information.

FIG. 6 is a diagram showing an example of option master data and related option master data produced from the record.

The example of FIG. 6 shows an aspect in which the option master data and the related option master data are produced from the combinations of five item names including "factory," "line," "process operation," "facility," and "product number," and their item values. It should be noted that the option master data and the related option master data may be produced from other item names.

The option master management section 121A assigns option IDs to the respective combinations of the item names and the item values of the fields constituting the record, the option IDs being different for each of the fields. For example, an option ID 00001 is assigned to the combination of the item name "factory" and its item value "F01." Similarly, an option ID 00002 is assigned to the combination of the item name "line" and its item value "L01," an option ID 00003 is assigned to the combination of the item name "process operation" and its item value "PRC01," an option ID 00004 is assigned to the combination of the item name "facility" and its item value "E01," and an option ID 00005 is assigned to the combination of the item name "product number" and its item value "PN-01."

The option master management section 121A performs first processing of producing option master data including an option ID, an item name, and an item value. In the example of FIG. 6, the option master data also includes a start date and time and an end date and time, and the option master data pieces produced from the same record have the same start date and time and the same end date and time.

Next, the option master management section 121A performs second processing of producing related option master data. For each one of the five fields, the option master management section 121A produces related option master data by setting the option ID of each of the other four fields as a related option ID. The option master management section 121A produces, for each one of the five fields, four related option master data pieces corresponding to the other four fields. In the example of FIG. 6, the option master management section 121A produces, for the option ID 00001, four related option master data pieces by setting the other four option IDs as related option IDs. Option related IDs are identification IDs of the respective related option master data pieces.

The second processing is performed for each of the option IDs. For the option ID 00002, the option master management section 121A produces the related option master data pieces corresponding to the option IDs 00001, 00003, 00004, and 00005. For the option IDs 00003, 00004, and 00005, the related option master data pieces are similarly produced as shown in FIG. 6.

The option master data and the related option master data produced in the first processing and the second processing described above are registered as the master information 132 in the storage apparatus 130 serving as a predetermined storage area (third processing).

FIG. 7 shows an example of option master data and related option master data produced in view of the relationship with already produced master data.

FIG. 7 shows an example of production of the option master data and the related option master data when the first processing and the second processing described above are performed on a manufacturing achievement record B different from the manufacturing achievement record A shown in FIG. 6, and illustrates an aspect in which the first processing and the second processing are performed on the manufacturing achievement record B after the option master data and the related master data shown in FIG. 6 are produced.

As shown in FIG. 7, the manufacturing achievement record B includes the same factory, the same line, and the same product number, but a different process operation and a different facility. This means that the same line is provided with different process operations and facilities. For the products having the same product number, the manufacturing achievement records A and B including the different process operations and facilities are produced and accumulated.

The manufacturing achievement records A and B have the same combinations of item names and item values in some of the fields. The option master management section 121A links the option master data pieces produced from the manufacturing achievement record A described above to the manufacturing achievement record B to avoid production of duplicate option master data pieces. In the first processing on the manufacturing achievement record B, the option master management section 121A determines whether or not the same combination of an item name and an item value of a field exists as any of the combinations of item names and item values in the already produced option master data pieces, and when the same combination exists, determines that the combination represents a duplicate option ID and performs control not to produce new option master data. In the example of FIG. 7, the option IDs 0001, 0002, and 0005 are determined as duplicate option IDs, and new option master data pieces for those option IDs are not produced.

The combination of an item name "process operation" and an item value "PRC02" and the combination of an item name "facility" and an item value "E02" do not exist in the already produced option mater data pieces. The first processing on the manufacturing achievement record B produces option master data pieces having option IDs 00006 and 00007. The option master data pieces having the option IDs 00001, 00002, 00006, 00007, and 00005 are linked to the manufacturing achievement record B.

The option IDs 00001, 00002, and 00005 are linked to both of the manufacturing achievement records A and B. To support both the manufacturing achievement records A and B, the option master management section 121A updates the start date and time and the end date and time of those option master data pieces based on the start date and time and the end date and time of the manufacturing achievement record B. In the example of FIG. 7, the option master data pieces having the option IDs 00001, 00002, and 00005 include the updated end dates and times to the end date and time of the manufacturing achievement record B.

In the second processing of producing related option master data, the option master management section 121A produces, for each one of the five fields, related option master data by setting the option ID of each of the other fields as a related option ID, but does not produce related option master data pieces including two of the option IDs 00001, 00002, and 00005 since such data pieces duplicate the related option mater data pieces produced from the manufacturing achievement record A.

Thus, the option master management section 121A produces, for each one of the five fields or the option master data pieces having the option IDs 00001, 00002, 00006, 00007, and 00005 from the manufacturing achievement data B, related option master data pieces corresponding to the other fields. In the second processing on the manufacturing achievement record B, the option master management section 121A determines whether or not the same combination exists as any of the combinations of option IDs and related option IDs in the already produced related option master data pieces, and when the same combinations exists, performs control not to produce a duplicate related option master data piece.

In contrast, for each of the option IDs 00006 and 00007, related option master data pieces including the option IDs 00001, 00002, and 00005 are not produced from the manufacturing achievement record A or registered as the master information 132. As shown in FIG. 7, those related option master data pieces are produced.

For the option ID 00001, related option master data pieces are produced and linked by setting the option IDs 00006 and 00007 as related option IDs. For the option ID 00006, related option master data pieces are produced and linked for the respective combinations with the option IDs 00001, 00002, 00007, and 00005. Similarly, for the option ID 00007, related option master data pieces are produced and linked for the respective combinations with the option IDs 00001, 00002, 00006, and 00005.

As described above, the option master management section 121A according to Embodiment 1 performs the first processing to produce, when the records have different item values in the same fields, option master data pieces as many as the different item values, and produce, when the records have the same item values in the same fields, option master data pieces so as to avoid duplicate combinations of item names and item values of the fields. In the second processing described above, the option master management section 121A produces, for each one of the fields, related option master data including the option ID of each of the other fields set as the related option ID by determining whether or not data to be produced is identical to any of the related option master data pieces already produced from the other record, and when it is determined that the data is identical, performing control not to produce duplicate related option master data.

FIG. 8 is a diagram showing an example of timing of production and registration of the option master data and the related option master data. FIG. 9 is a diagram showing a flow of producing the option master data and the related option master data.

As shown in FIG. 8, the option master management section 121A can be configured to perform the first processing, the second processing, and third processing (production and registration of the option master data and the related option master data) on a new record at the timing of registration of the new record as manufacturing achievement data or the timing at predetermined time intervals.

Specifically, the production and registration of the option master data and the related option master data can be triggered by the timing of accumulation of the produced record. In the former case, maintenance of the option master information is performed in real time for the record registration (accumulation), and in the latter case, maintenance is performed at predetermined time intervals, for example, every few seconds or every few minutes.

After the manufacturing achievement data is accumulated as the record (S101), the option master management section 121A performs processing of producing the option master data and the related option master data at the predetermined timing described above (S102, the first and second processing), and performs processing of registering the produced option master data and related option master data (S103, the third processing).

FIG. 10 is a diagram showing a flow chart of information processing including option providing processing in response to an option request on the search screen.

The data search function section 121B performs processing of providing options to search items on the search screen by using the registered option master data and related option master data and performs processing of extracting manufacturing achievement data based on search conditions.

Description is made with reference to the search screen shown in FIG. 5 as an example. For example, a searcher selects an option button (black triangle icon) of the search item "line." The data search function section 121B receives a request of options of the search item "line" (S110) and determines whether or not any option is already selected in the associated search items other than the search item whose option request was received (S111). When it is determined that no option is selected in the search items other than the search item "line," the data search function section 121B extracts the option ID having the item name "line" from only the option master data and outputs the item value of the extracted option ID as the option (S112).

It is assumed that the searcher selects an option button (black triangle icon) of the search item "process operation" after the search item "line." The data search function section 121B receives a request of options of the search item "process operation" (S110) and determines whether or not any option is already selected in the associated search items other than the search item whose option request was received (S111). In this case, the option is already selected in the search item "line" other than the search item "process operation," so that the data search function section 121B performs the processing of extracting options based on the option master data and the related option master data.

Specifically, the data search function section 121B extracts the related option master data pieces linked to the search item "process operation" that include, as the related option ID, the option ID of the option specified in the search item "line" (S113). In other words, the data search function section 121B extracts all the related option master data pieces that include, as the related option ID, the option ID of the option specified in the search item "line," from the related option master data pieces linked to the option master data produced with the item name "process operation." Then, the data search function section 121B outputs the item values of the option ID linked to the extracted related option master data pieces as the options of the search item "process operation" (S114).

For example, description is made with reference to the records shown in FIGS. 6 and 7 as an example. With the option "L01 (option ID 00002) specified in the search item "line," the data search function section 121B extracts, as the options to be output to the search item "process operation," the option IDs 00003 and 00006 including the option ID 00002 set as the related option ID. Thus, the data search function section 121B outputs and displays "PRC01" and PRC02" as the options of the search item "process operation."

In response to selection of a search execution button, not shown (S115), the data search function section 121B refers to the manufacturing achievement data 131 by using the option specified in the search item and/or directly input data as a search condition (search key), extracts the manufacturing achievement data 131 which satisfies the condition, and outputs and displays the search result on a predetermined screen (S116). When end processing is performed without selecting the search execution button, the control of the search function is ended (S117).

Embodiment 1 illustrates an aspect in which the option master management section 121A and the data search function section 121B are included as one function of the information management system 100 for accumulating and managing the manufacturing achievement data. Alternatively, the option master management section 121A can be provided, as an option management apparatus, similarly to an option management application such as an API for the information management system.

For example, the information management system for accumulating and managing the manufacturing achievement data can connect to an independent option management apparatus (option master management section 121A) over a network, and the option management apparatus can refer to the manufacturing achievement data of the information management apparatus to produce the option master data and related option master data. The produced option master data and related option master data can be provided for the information management system as the master information 132, and the data search function section 121B can provide the search function. In this manner, the function of the option master maintenance and the function of the option master provision according to Embodiment 1 can be provided internally or externally to the information management system for accumulating and managing the manufacturing achievement data.

While Embodiment 1 has been described, the records according to Embodiment 1 are not limited to the manufacturing achievement data. For example, the option master management function described above can be applied to an information management system for accumulating and managing quality test achievements (product numbers, processes, facilities, test items etc.), member reception achievements (part numbers, suppliers, reception test items etc.), and facility maintenance achievements (facilities, maintenance types, maintenance items etc.).

Similarly to the manufacturing achievement data, the data such as the quality test achievements, the member reception achievements, and the facility maintenance achievements can have the record configuration produced by structuring the collected various types of information according to the data model shown in FIG. 4, that is, the data structure definition shown in FIG. 4. It should be noted that, while the function of the option master maintenance and the function of the option master provision according to Embodiment 1 are applicable to other than accumulation and management of data based on the data mode described above, the option master management function according to Embodiment 1 can be applied to accumulation and management of data based on the same data model to allow use of options in different situations. For example, one advantage is that different operations (such as manufacturing and facility maintenance) can share the same perspective.

The functions according to Embodiment 1 can be applied to data of a Key-Value Store (KVS) structure other than the record format of the relational data base (RDB). The KVS data store format is a combination of Key and Value, and the combination corresponds to the item name and the item value of the field described above. For example, KEY "factory: F01_line: L01" holds Value "L01," and KEY "factory: F01_process operation: PRC01" holds Value "PRC01." Each KEY corresponds to the item name and its item value corresponds to Value. Thus, the processing of the option master production and registration described above can be applied to produce and register the option master data and the related option master data.

The functions constituting the information management apparatus 100 described above can be implemented by a program. A computer program previously provided for implementing the functions can be stored on an auxiliary storage apparatus, the program stored on the auxiliary storage apparatus can be read by a control section such as a CPU to a main storage apparatus, and the program read to the main storage apparatus can be executed by the control section to achieve the functions of the respective components.

The program may be recorded on a computer readable recording medium and provided for the computer. Examples of the computer readable recording medium include optical disks such as CD-ROMs, phase-change optical disks such as DVD-ROMs, magneto-optical disks such as Magnet-Optical (MO) disks and Mini Disks (MD), magnetic disks such as floppy Disks® and removable hard disks, and memory cards such as compact Flash® memory cards, smart media, SD memory cards, and memory sticks. Hardware apparatuses such as integrated circuits (such as IC chips) designed and configured specifically for the purpose of the present invention are included in the recording medium.

While the exemplary embodiment of the present invention has been described above, the embodiment is only illustrative and is not intended to limit the scope of the present invention. The novel embodiment can be implemented in various other forms, and various omissions, substitutions, and modifications can be made thereto without departing from the spirit or scope of the present invention. These embodiments and variations are encompassed within the spirit or scope of the present invention and within the invention set forth in the claims and the equivalents thereof.

DESCRIPTION OF THE REFERENCE NUMERALS

100 INFORMATION MANAGEMENT SYSTEM
110 COMMUNICATION APPARATUS
120 CONTROL APPARATUS
121 INFORMATION MANAGEMENT SECTION
121A OPTION MASTER MANAGEMENT SECTION
121B DATA SEARCH FUNCTION SECTION
122 DATA ACCUMULATION MANAGEMENT SECTION
130 STORAGE APPARATUS
131 MANUFACTURING ACHIEVEMENT DATA
132 MASTER INFORMATION (OPTION MASTER DATA, RELATED OPTION MASTER DATA)

The invention claimed is:

1. An information management system comprising one or more processors configured to function as:

a first control section configured to perform

11 first processing of assigning option IDs to combinations of item names and item values of fields constituting a record, the option IDs being different for each of the fields, and producing option master data pieces each including the option ID, the item name, and the item value, second processing of producing, for each one of the fields, related option master data pieces by setting the option ID of each of the other fields as a related option ID, the number of the produced related option master data pieces corresponding to the number of the other fields, and third processing of registering the option master data pieces and the related option master data pieces in a predetermined storage area; and a second control section configured to output, on a search screen showing the fields set as search items, the item values as options of the search items, and when an option is specified in a first search item, extract at least one of the related option master data pieces that includes the option ID of the specified option as the related option ID, and output, as an option of a second search item, the item value of the option ID linked to the extracted at least one related option master data piece, wherein the first control section is configured to perform the first processing of producing, when records have different item values in the same fields, the option master data pieces as many as the different item values, and producing, when the records have the same item values in the same fields, the option master data pieces so as to avoid duplicate combinations of item names and item values of the fields, and where the first control section is further configured to produce, from one of the records, for each one of the fields, the related option master data piece including the option ID of each of the other fields set as the related option ID by determining whether data to be produced is identical to any of the related option master data pieces already produced from any of the other records, and when it is determined that the data is identical, performing control not to produce duplicate related option master data.

2. An information management system comprising one or more processors configured to function as:

a first control section configured to perform first processing of assigning option IDs to combinations of item names and item values of fields constituting a record, the option IDs being different for each of the fields, and producing option master data pieces each including the option ID, the item name, and the item value, second processing of producing, for each one of the fields, related option master data pieces by setting the option ID of each of the other fields as a related option ID, the number of the produced related option master data pieces corresponding to the number of the other fields, and third processing of registering the option master data pieces and the related option master data pieces in a predetermined storage area; and a second control section configured to

12 output, on a search screen showing the fields set as search items, the item values as options of the search items, and when an option is specified in a first search item, extract at least one of the related option master data pieces that includes the option ID of the specified option as the related option ID, and output, as an option of a second search item, the item value of the option ID linked to the extracted at least one related option master data piece, wherein the record is manufacturing achievement data and includes a first field indicating a manufacturing place of products, a second field indicating a line where a process operation is performed, a third field indicating details of a process operation, a fourth field indicating a facility used in a process operation, a fifth field indicating a product number assigned to products of the same type, a sixth field indicating a date and time of a process, and a seventh field indicating an end date and time associated with the start date and time, and the first control section is configured to perform the first processing, the second processing, and the third processing on a new record at a timing of registration of the new record as the manufacturing achievement data or a timing at predetermined time intervals.

3. A non-transitory computer readable recording medium storing a program comprising instructions executable by a computer, wherein the instructions, when executed by the computer, cause the computer to provide:

a first function of assigning option IDs to combinations of item names and item values of fields constituting a record, the option IDs being different for each of the fields, and producing option master data pieces each including the option ID, the item name, and the item value;

a second function of producing, for each one of the fields, related option master data pieces by setting the option ID of each of the other fields as a related option ID, the number of the produced related option master data pieces corresponding to the number of the other fields;

a third function of registering the option master data pieces and the related option master data pieces in a predetermined storage area; and a fourth function of outputting, on a search screen showing the fields set as search items, the item values as options of the search items, and when an option is specified in a first search item, extracting at least one of the related option master data pieces that includes the option ID of the specified option as the related option ID, and outputting, as an option of a second search item, the item value of the option ID linked to the extracted at least one related option master data piece, wherein the instructions cause the computer to provide the first function of producing, when records have different item values in the same fields, the option master data pieces as many as the different item values, and producing, when the records have the same item values in the same fields, the option master data pieces so as to avoid duplicate combinations of item names and item values of the fields, and wherein the instructions cause the computer to produce, from one of the records, for each one of the fields, the related option master data piece including the option ID of each of the other fields set as the related option ID by determining whether data to be produced is identical to any of the related option master data pieces already produced from any of the other records, and when it is determined that the data is identical, performing control not to produce duplicate related option master data.

4. An option management apparatus comprising one or more processors configured to function as:

a first processing section configured to assign option IDs to combinations of item names and item values of fields constituting a record, the option IDs being different for each of the fields, and produce option master data pieces each including the option ID, the item name, and the item value;

a second processing section configured to produce, for each one of the fields, related option master data pieces by setting the option ID of each of the other fields as a related option ID, the number of the produced related option master data pieces corresponding to the number of the other field; and a third processing section configured to register the option master data pieces and the related option master data pieces in a predetermined storage area, wherein, on a search screen showing the fields set as search items, when one of options is specified in a first search item where the item values are output as the options, the related option master data pieces are referred to extract at least one option in a second search item associated with the first search item and are used to extract the option ID including, as the related option ID, the option ID of the option specified in the first search item, wherein the first processing section is configured to produce, when records have different item values in the same fields, the option master data pieces as many as the different item values, and produce, when the records have the same item values in the same fields, the option master data pieces so as to avoid duplicate combinations of item names and item values of the fields, and where the second processing section is further configured to produce, from one of the records, for each one of the fields, the related option master data piece including the option ID of each of the other fields set as the related option ID by determining whether data to be produced is identical to any of the related option master data pieces already produced from any of the other records, and when it is determined that the data is identical, performing control not to produce duplicate related option master data.

5. A non-transitory computer readable recording medium storing a program comprising instructions executable by a computer, wherein the instructions, when executed by the computer, cause the computer to provide:

a first function of assigning option IDs to combinations of item names and item values of fields constituting a record, the option IDs being different for each of the fields, and producing option master data pieces each including the option ID, the item name, and the item value;

a second function of producing, for each one of the fields, related option master data pieces by setting the option ID of each of the other fields as a related option ID, the number of the produced related option master data pieces corresponding to the number of the other fields;

a third function of registering the option master data pieces and the related option master data pieces in a predetermined storage area; and a fourth function of outputting, on a search screen showing the fields set as search items, the item values as options of the search items, and when an option is specified in a first search item, extracting at least one of the related option master data pieces that includes the option ID of the specified option as the related option ID, and outputting, as an option of a second search item, the item value of the option ID linked to the extracted at least one related option master data piece, wherein the record is manufacturing achievement data and includes a first field indicating a manufacturing place of products, a second field indicating a line where a process operation is performed, a third field indicating details of a process operation, a fourth field indicating a facility used in a process operation, a fifth field indicating a product number assigned to products of the same type, a sixth field indicating a date and time of a process, and a seventh field indicating an end date and time associated with the start date and time, and the instructions cause the computer to perform the first function, the second function, and the third function on a new record at a timing of registration of the new record as the manufacturing achievement data or a timing at predetermined time intervals.

6. An option management apparatus comprising one or more processors configured to function as:

a first processing section configured to assign option IDs to combinations of item names and item values of fields constituting a record, the option IDs being different for each of the fields, and produce option master data pieces each including the option ID, the item name, and the item value;

a second processing section configured to produce, for each one of the fields, related option master data pieces by setting the option ID of each of the other fields as a related option ID, the number of the produced related option master data pieces corresponding to the number of the other field; and a third processing section configured to register the option master data pieces and the related option master data pieces in a predetermined storage area, wherein, on a search screen showing the fields set as search items, when one of options is specified in a first search item where the item values are output as the options, the related option master data pieces are referred to extract at least one option in a second search item associated with the first search item and are used to extract the option ID including, as the related option ID, the option ID of the option specified in the first search item, the record is manufacturing achievement data and includes a first field indicating a manufacturing place of products, a second field indicating a line where a process operation is performed, a third field indicating details of a process operation, a fourth field indicating a facility used in a process operation, a fifth field indicating a product number assigned to products of the same type, a sixth field indicating a date and time of a process, and a seventh field indicating an end date and time associated with the start date and time, and the first processing section, the second processing section, and the third processing section are configured to perform processing on a new record at a timing of registration of the new record as the manufacturing achievement data or a timing at predetermined time intervals.

* * * * *